United States Patent [19]

Tadauchi et al.

[11] Patent Number: 4,914,454

[45] Date of Patent: Apr. 3, 1990

[54] IMAGE RECORDING SYSTEM CAPABLE OF FORMING IMAGE WITH DIFFERENT COLORS IN DIFFERENT AREAS

[75] Inventors: Yukio Tadauchi; Hiroshi Maekawa; Kiyoshi Emori, all of Osaka, Japan

[73] Assignee: Minolta Camera Kabushiki Kaisha, Osaka, Japan

[21] Appl. No.: 337,096

[22] Filed: Apr. 12, 1989

[30] Foreign Application Priority Data

Apr. 14, 1988 [JP] Japan ................... 63-93227
Apr. 14, 1988 [JP] Japan ................... 63-93228

[51] Int. Cl.⁴ .................................. G01D 15/00
[52] U.S. Cl. ............................... 346/150; 346/134
[58] Field of Search .......... 346/150, 153.1, 160.1, 346/134, 136; 355/308, 309, 311

[56] References Cited

U.S. PATENT DOCUMENTS

| | | | |
|---|---|---|---|
| 2,910,963 | 11/1959 | Herman | 346/150 |
| 3,572,288 | 8/1968 | Turner | 346/150 |
| 3,914,043 | 10/1975 | McVeigh | 346/150 |
| 3,960,445 | 6/1976 | Drawe | 346/150 |
| 3,967,891 | 7/1976 | Rippstein | 346/150 |
| 4,099,860 | 7/1978 | Connin | 346/150 |
| 4,256,400 | 3/1981 | Komori et al. | 346/150 |
| 4,275,958 | 6/1981 | Tachika et al. | 346/150 |
| 4,336,994 | 6/1982 | Banton | 346/150 |
| 4,346,982 | 8/1982 | Nakajima et al. | 346/150 |
| 4,373,798 | 2/1983 | Tsukada et al. | 346/150 |
| 4,552,449 | 11/1985 | Wakamatsu et al. | 346/150 |
| 4,572,102 | 2/1986 | Yuge et al. | 346/150 |
| 4,579,443 | 4/1986 | Abuyama et al. | 356/150 |
| 4,582,417 | 4/1986 | Yagasaki et al. | 346/150 |
| 4,587,568 | 5/1986 | Takayama et al. | 346/150 |
| 4,619,514 | 10/1986 | Ide | 346/150 |
| 4,627,707 | 12/1986 | Tani et al. | 346/150 |
| 4,634,259 | 1/1987 | Oishi et al. | 346/150 |
| 4,641,602 | 2/1987 | Kasai | 346/150 |
| 4,655,580 | 4/1987 | Watanabe et al. | 346/150 |
| 4,657,376 | 4/1987 | Ide | 346/150 |
| 4,659,211 | 4/1987 | Oka | 346/150 |
| 4,666,288 | 5/1987 | Watanabe | 346/150 |
| 4,668,978 | 5/1987 | Gokita | 346/150 |
| 4,685,794 | 8/1987 | Watanabe | 346/150 |
| 4,690,543 | 9/1987 | Watanabe | 346/150 |
| 4,710,016 | 12/1987 | Watanabe | 346/150 |
| 4,720,730 | 1/1988 | Ito | 346/150 |
| 4,723,148 | 2/1988 | Hamakawa | 346/150 |
| 4,728,985 | 3/1988 | Nakashima et al. | 346/150 |
| 4,731,637 | 3/1988 | Acquaviva et al. | 346/150 |
| 4,740,811 | 4/1988 | Watanabe | 346/150 |
| 4,743,945 | 5/1988 | Ito et al. | 346/150 |
| 4,743,946 | 5/1988 | Nishimori et al. | 346/150 |
| 4,745,437 | 5/1988 | Oka et al. | 346/150 |
| 4,746,954 | 5/1988 | Matuura et al. | 346/150 |
| 4,754,301 | 6/1988 | Kasamura et al. | 346/150 |
| 4,772,921 | 9/1988 | Ito | 346/150 |
| 4,803,520 | 2/1989 | Tomasada et al. | 346/150 |

FOREIGN PATENT DOCUMENTS

| | | | |
|---|---|---|---|
| 3705511 | 9/1987 | Fed. Rep. of Germany | 346/150 |
| 48-22212 | 7/1973 | Japan | 346/150 |
| 51-134635 | 11/1976 | Japan | 346/150 |
| 54-30833 | 3/1979 | Japan | 346/150 |
| 60-170868 | 9/1985 | Japan | 346/150 |
| 60-194469 | 10/1985 | Japan | 346/150 |
| 60-212778 | 10/1985 | Japan | 346/150 |
| 61-72270 | 4/1986 | Japan | 346/150 |
| 61-203474 | 9/1986 | Japan | 346/150 |
| 62-61464 | 3/1987 | Japan | 346/150 |
| 62-90186 | 6/1987 | Japan | 346/150 |
| 62-59504 | 12/1987 | Japan | 346/150 |

*Primary Examiner*—Arthur G. Evans
*Attorney, Agent, or Firm*—Burns, Doane, Swecker & Mathis

[57] ABSTRACT

An image recording system including a host control unit for generating image data and a printer apparatus for forming an image on a sheet of paper in accordance with the image data. The printer apparatus has a function of dividing the image into two image areas with respect to a boundary extending in a direction orthogonal to the direction of transport of the paper and of forming each of the image areas with different colors. The host control unit is adapted to supply to the printer apparatus a boundary signal indicative of the boundary of the image areas. The printer apparatus has a controller for automatically selecting a first orientation in which the lengthwise direction of the sheet is the direction of transport when the boundary signal indicates a boundary extending in the widthwise direction of the sheet and for automatically selecting a second orientation in which the widthwise direction of the sheet of paper when the boundary signal indicates a boundary extending in the lengthwise direction of the sheet.

11 Claims, 17 Drawing Sheets

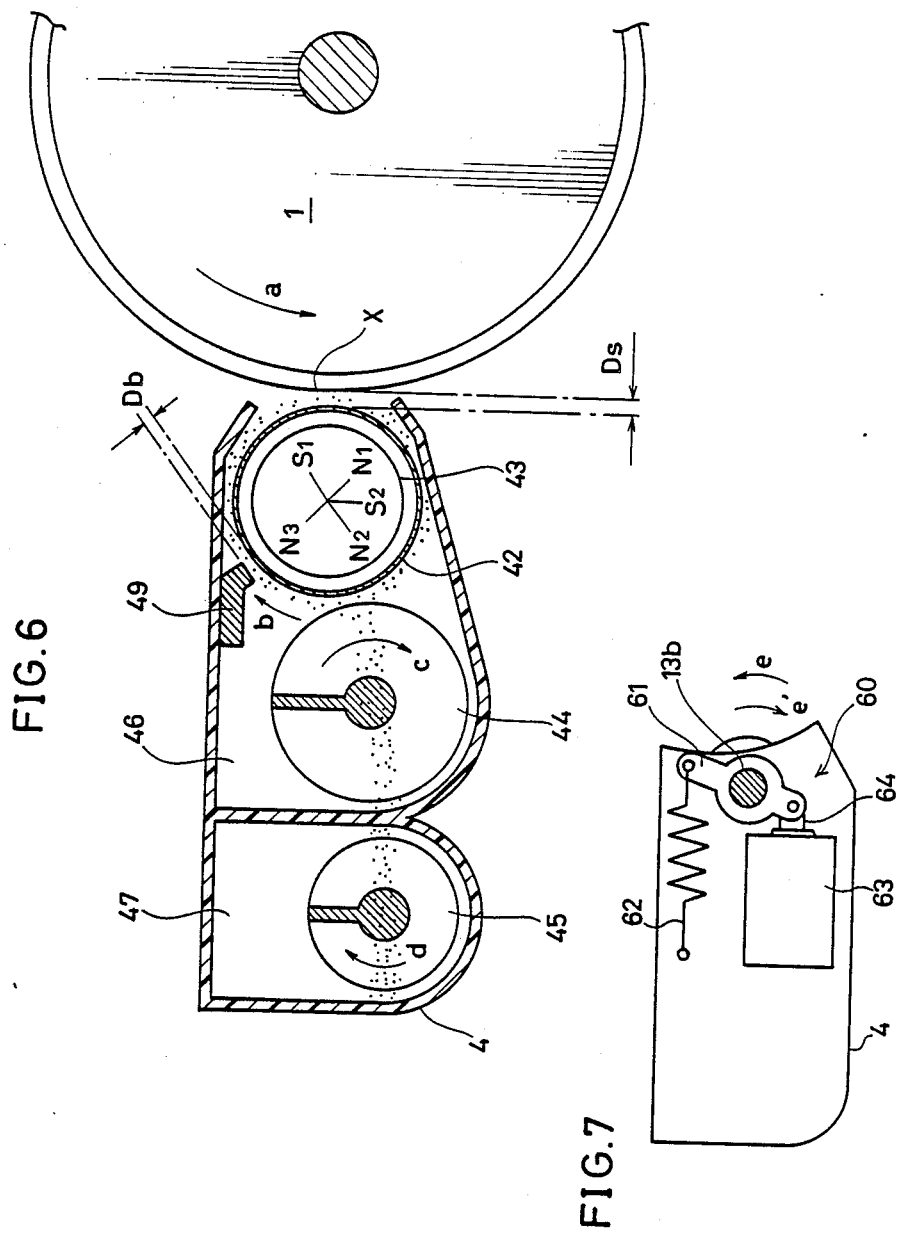

IMAGE RECORDING SYSTEM CAPABLE OF FORMING IMAGE WITH DIFFERENT COLORS IN DIFFERENT AREAS

CROSS REFERENCE TO RELATED COPENDING APPLICATION

Related copending applications of particular interest to the present invention are U.S. Ser. No. 148,423 entitled "Multi-Color Image Forming Apparatus", filed on Jan. 25, 1988, and U.S. Ser. No. 242,419 entitled "Image Recording System", filed on Sept. 9, 1988.

BACKGROUND OF THE INVENTION

1. Field of the Invention

The present invention relates to an image recording system and, more specifically, to an image recording system comprising a host control unit for generating image data and a printer apparatus for an image on a paper in accordance with the image data, the printer apparatus being capable of dividing the image to be recorded into a plurality of areas and of forming respective areas of the image with different colors.

2. Description of the Related Art

A printer connected to a host machine such as a word processor, a personal computer for business use or the like to print various data such as letters, characters and images as hard copies has come to be provided with a color printing function, as host machines have come to have various functions and various manners of printing such as color printing have been desired.

Japanese Patent Laying-Open Gazette No. 203474/1986 discloses an electrophotographic copying machine capable of providing a multicolor copy by one copying operation by switching and driving a plurality of developing units containing developers of different colors. In this copying machine, areas which are to be developed by respective developing units are designated by inputting coordinates on an operation panel, visually checking the original.

Multicolor printing of 1 page is made possible in a photoelectric printer by providing a plurality of developing units and by witching these developing units as in the case of the above mentioned copying machine.

However, when multicolor printing of one page is carried out by switching the developing units, the division of areas is limited in the direction of transport of a photoreceptor, that is, the direction in which a sheet of paper passes through. Therefore, when area designation is carried out on a display of a host machine, the direction of paper transport corresponding to the designated areas must be taken in consideration.

SUMMARY OF THE INVENTION

An object of the present invention is to facilitate image formation in an image recording system capable of providing a multicolor image on 1 page by one recording operation.

Another object of the present invention is to eliminate possibility of misprinting regardless of a direction of setting papers in an image recording system capable of providing a multicolor image of 1 page by one recording operation.

The above described objects can be attained by an image recording system in accordance with the present invention comprising a host control unit generating image data and a printer apparatus forming an image on a sheet of paper in accordance with image data generated from the host control unit, wherein the printer apparatus has a function of dividing image into at least two image areas in association with a boundary extending in a direction orthogonal to a direction of transporting a sheet of paper and of forming respective image areas in different colors, the host control unit is adapted to provide a boundary signal indicating the boundary of at least two image areas which are to be printed in different colors to the printer apparatus, and the printer apparatus includes selecting means. The selecting means selects a first orientation in which a lengthwise direction of the sheet is the direction of transport when the boundary signal indicates a boundary extending in the widthwise direction of the sheet, and selects a second orientation in which the widthwise direction of the sheet is the direction of transport when the border signal indicates a boundary extending in the longitudinal direction of the sheet.

In the image recording system structured as described above, the direction of feeding sheets of paper is automatically controlled corresponding to the direction of division of the images, so that the copying operation is facilitated and the possibility of miscopies can be eliminated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an enlarged- cross sectional view showing a state of the developing unit shown in FIG. 2 when it is not operating;

FIG. 7 is a schematic diagram showing a state of driving the magnetic roller corresponding to FIG. 6;

DESCRIPTION OF THE PREFERRED EMBODIMENTS

Figure 1:
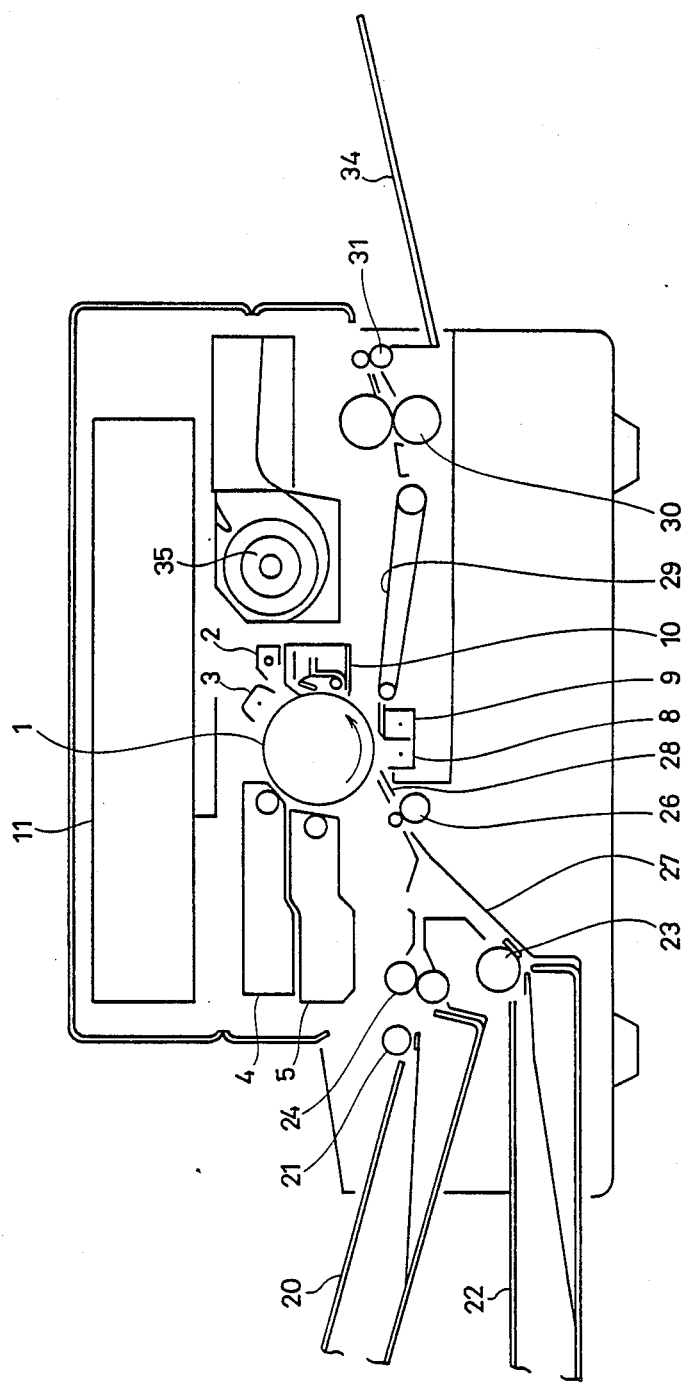
FIG. 1 is a schematic cross sectional view printer in accordance with one embodiment of the present invention.
Figure 2:
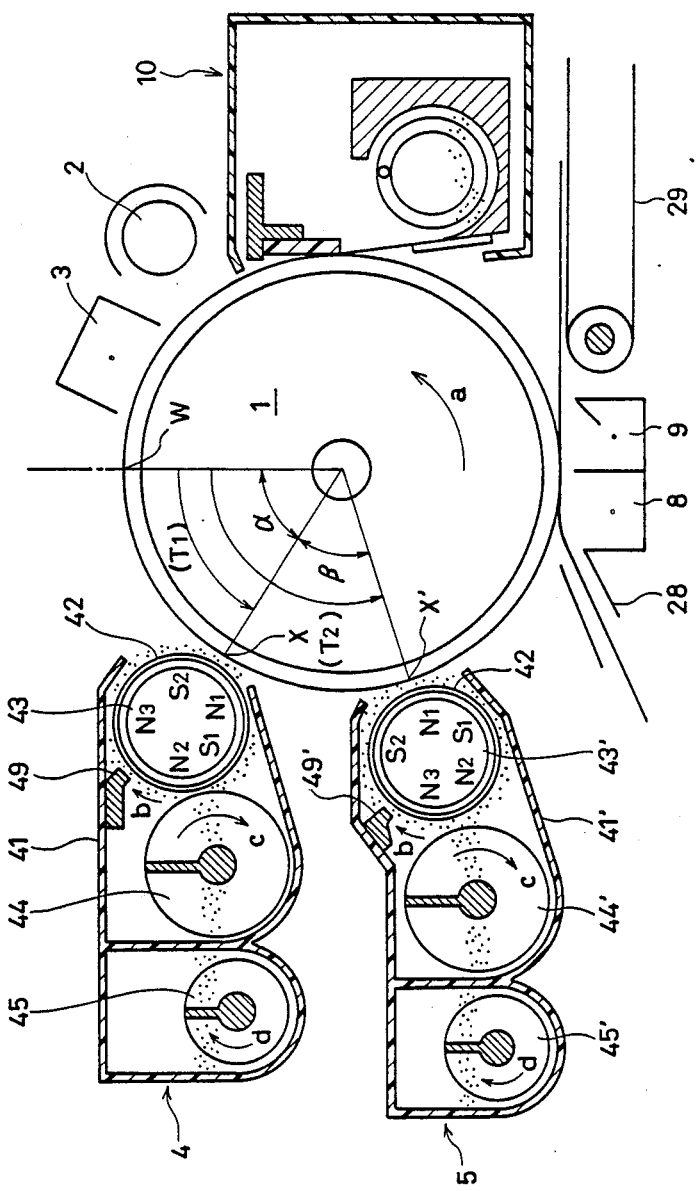
FIG. 2 is a detailed cross sectional view showing a structure of a photoreceptor drum and the peripheral portions thereof shown in FIG. 1.

FIG. 1 is a schematic cross sectional view showing a structure of a printer in accordance with one embodiment of the present invention.

A photoreceptor drum 1 which can be rotary driven in a counter clockwise direction is provided approximately at the center of a printer body. A main eraser lamp 2, a corona charger 3, a first developing unit 4, a second developing unit 5, a transfer charger 8, a separation charger 9 for separating copy papers, a blade type cleaner apparatus 10 and so on are arranged in this order around the photoreceptor drum 1. A photosensitive layer is provided on the surface of the photoreceptor drum 1, and it is irradiated by the eraser lamp 2 at every rotation and is charged by the corona charger 3. The charged photoreceptor drum 1 is exposed by a laser beam emitted from a laser optical unit 11.

Upper and lower paper feeding portions respectively comprising paper feeding rollers 21 and 23 are mounted on the left side of the printer body, to which a first cassette 20 and a second cassette 22 are attached, respectively. A roller pair 24, a timing roller pair 26, guiding plates 27 and 28, a conveyer belt, 29, a fixing roller pair 30 and a discharging roller pair 31 constitute a conveying path of the copy papers contained in the cassettes 20 and 22.

The laser beam is on/off modulated corresponding to the image data from the host machine, irradiated on the photoreceptor drum 1 and forms latent electrostatic images on the drum 1. Toners contained in the first and second developing units 4 and 5 are applied to the latent electrostatic images by selectively driving the first and second developing units 4 and 5. The toner images on the photoreceptor drum 1 are a transferred by the transfer charger 8 to a sheet of paper fed from the timing roller pair 26 in synchronization with the toner image forming region. The sheet is separated from the surface of the photoreceptor drum 1 by the separating charger 9 and is fed to the fixing roller pair 30 by the conveyer belt 29. The toner is heat fixed therein, and the sheet is fed to the charging tray 34 by the discharging roller pair 31. An exhaust fan is provided to prevent increase of temperature in the copying machine caused by the heat from the fixing roller pair and the like. The photoreceptor drum 1, the paper feeding rollers 21 and 23, the roller pair 24, the timing roller pair 26, the first and second developing units 4 and 5, the conveyor belt 29, the fixing roller pair 30, the discharging roller pair 31 and so on are adapted to be driven by a main motor, not shown. The paper feeding rollers 21 and 23, the timing roller pair 26, the roller pair 24, the first and second developing units 4 and 5 and so on are adapted to be selectively connected to the main motor by means of a solenoid, a magnetic spring clutch or the like (not shown), so that each of these component can operate independently.

FIGS. 2 to 7 illustrate the structure of the developing units employed in the copying machine of FIG. 1 and the switch driving thereof.

Figure 4:
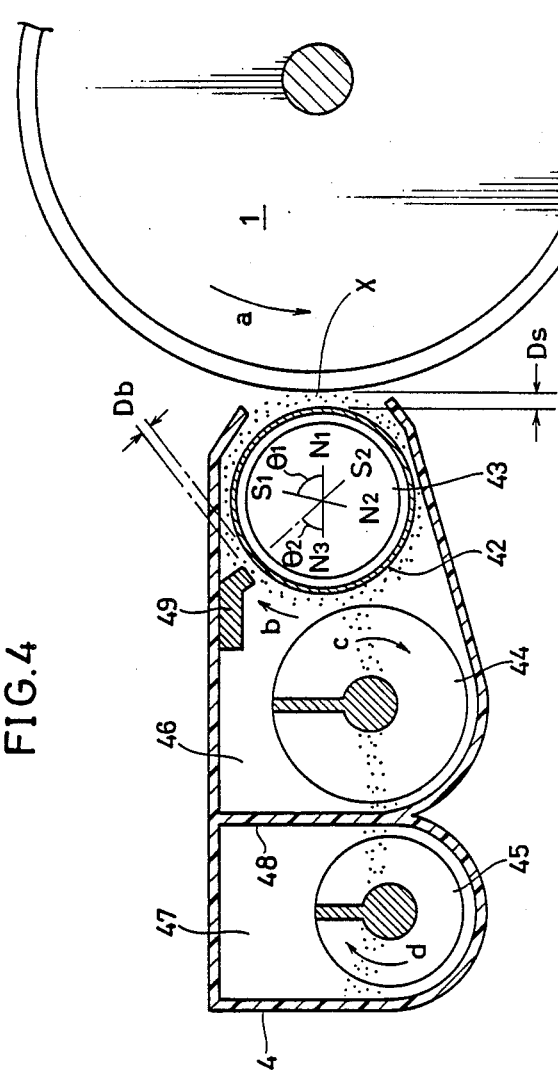
FIG. 4 is an enlarged cross sectional view showing a state of the developing unit being driven shown in FIG. 2.

Since the developing units 4 and 5 have approximately the same structure as shown in FIG. 4, detailed description will be given only of the developing unit 4. In a developer tank 41, a developing sleeve 42, a supply roller 44 and a screw 45 are arranged in this order from the side of the photoreceptor drum 1.

The developing sleeve 42 is a cylinder ($\phi$24.5 mm) formed of a non-magnetic conductive material whose outer surface made rough by sand blasting. The developing sleeve 42 is opposed to the photoreceptor drum 1 at a developing position X with a developing gap: Ds (=0.6 mm) provided therebetween, and the angle of rotation from the exposure point W to the developing point X is set at $\alpha$.

On the rear side of the portion opposing to the developing position X of the developing sleeve 42, there is provided a regulating member 49 formed on the upper portion of the inner surface of the developer tank 41 with a regulating gap: Db (=0.4 mm) provided therebetween. The regulating member 49 regulates the height of toner applied on the developing sleeve 42.

A magnet roller 43 is provided in the developing sleeve 42. The magnetic power of the magnetic pole N1 to N3, S1 and S2 positioned on the outer periphery are N1=1000G, N2, N3=500G, and S1, S2=800G (G is an abbreviation of gauss), respectively.

The center of the magnetic pole N1 is placed at a position which is spaced apart from the center of the magnetic pole S1 by $\theta_1$ (80°) in the clockwise direction. The center of the magnetic pole N3 is placed at a position spaced apart from the portion opposing to the regulating member 49 by $\theta_2$ (40°) in the counter clockwise direction, with the magnetic pole N1 opposing to the photoreceptor drum 1, as shown in FIG. 4.

A support axis 43a of the magnet roller 43 has its one end portion 43a supported by a concave portion 42c of a bearing provided in the developing sleeve 42 and the other end portion 43b supported by a sidewall of the developing tank 42. The magnet roller 43 can be turned by a prescribed angle ($\theta_1$=40°) by moving means 60 which will be described in detail in the following.

Figure 3:
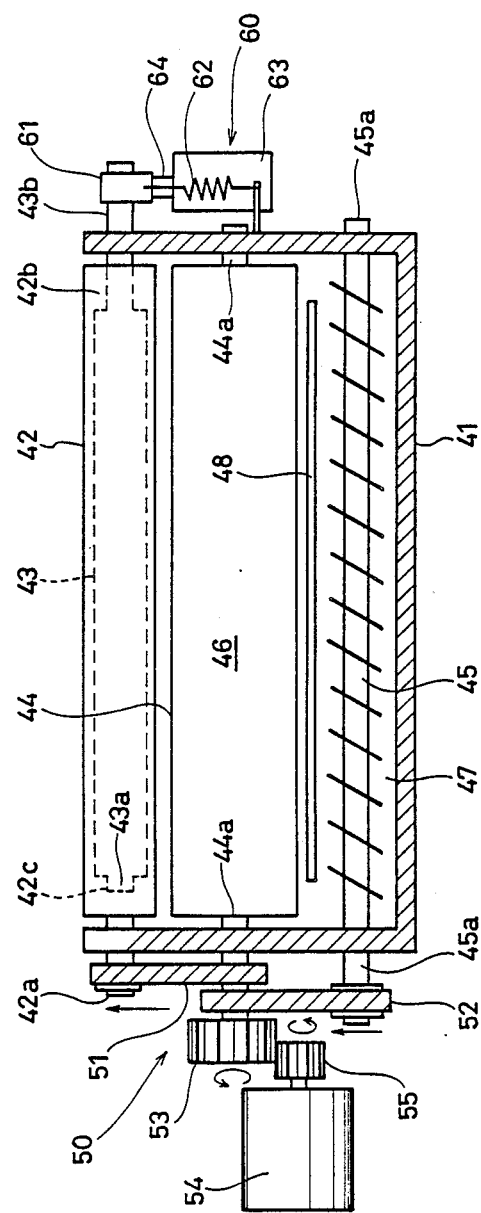
FIG. 3 is a cross sectional view showing an internal structure of the developing unit shown in FIG. 2.

Meanwhile, the developing sleeve 42 has its bearing portion 42b in the right side as viewed in FIG. 3 supported by the support axis 43b of the magnet roller 43 and its support axis 42a on the opposite side supported by the sidewall of the developing tank 41. The developing sleeve 42 can be rotary driven by driving means 50.

A supply roller 44 and a screw 45 are respectively provided in conveying paths 46 and 47 which are separated from each other by a partition 48. These rollers 44 and 45 have their support axes 44a and 45a supported by the sidewalls of the developing tank 41 and the rollers are driven by the driving means 50.

The conveyer paths 46 and 47 communicate with each other on both sides of the developing tank 41 (between the partition 48 and the sidewall of the developing tank 41) as shown in FIG. 3.

As shown in FIG. 3, a belt 51 is wound around the support axis 42a of the developing sleeve 42 and the support axis 44a of the supply roller 44. A belt 52 is wound around the support axis 44a of the supply roller 44 and the support axis 45 of the screw 45.

A gear 53 is attached to an end portion of the support axis 44a of the supply roller 44, which gear being engaged with a driving gear 55 of a motor 54.

Therefore, when the driving gear 55 is rotated in the direction of the solid line in FIG. 3 by driving the motor 54, the gear 53 and the belts 51 and 52 are driven in the direction of the solid line, respectively. Consequently, the developing sleeve 42, the supply roller 44 and the screw 45 are rotated in the direction of the arrows b, c and d, respectively (see FIG. 2). In this embodiment, the developing sleeve 42 is adapted to rotate at a speed of 240 rpm.

Figure 5:
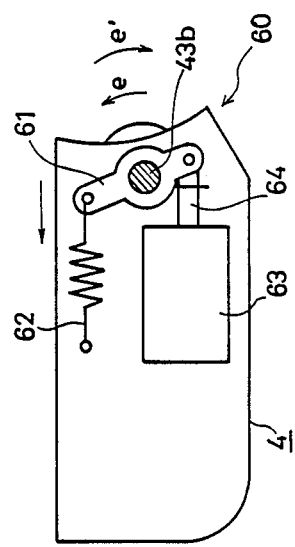
FIG. 5 show a state of driving a magnet roller corresponding to the state of FIG. 4.

The moving means 60 for the magnet roller 43 comprises a lever 61, a spring 62 and a solenoid 63, as shown in FIGS. 5 and 7. The lever 61 is fixed to an end portion of the support axis 43b of the magnet roller 43 and one end of the spring 62 fixed to the developing tank 41 is fixed thereto, always being biased in the direction of the arrow e. A plunger 64 of the solenoid 63 is engaged with the other end side of the lever 61, and when the solenoid 63 is driven, it rotates the lever 61 in the direction of the arrow e, against the biasing power of the spring 62.

When the solenoid 63 is not operating, that is, when the lever 61 is in the state of FIG. 5, the magnetic pole N1 of the magnet roller 43 is opposed to the photoreceptor drum 1 and the magnetic pole N3 is positioned spaced apart from the position opposing to the regulating member 49 by $\theta_2(40°)$ in the counterclockwise direction.

On the contrary, when the solenoid 63 is driven and the lever 61 is in the state shown in FIG. 7, the magnet roller 43 rotates such that the magnetic pole N3 is opposed to the regulating member 49 and a portion between the magnetic poles N1 and S1 is opposed to the photoreceptor drum 1, as shown in FIG. 6.

The toner is applied to the photoreceptor drum 1 from the developing unit 4 in the state shown in FIG. 4, while the toner is not applied to the photoreceptor drum 1 from the developer unit 4 in the state shown in FIG. 6. Namely, in the state of FIG. 6, an intermediate portion between the N and S magnetic poles is opposed to the photoreceptor drum 1, that is, a portion of the developing sleeve 42 on which there is no toner is opposed to the photoreceptor drum 1.

Figure 8:
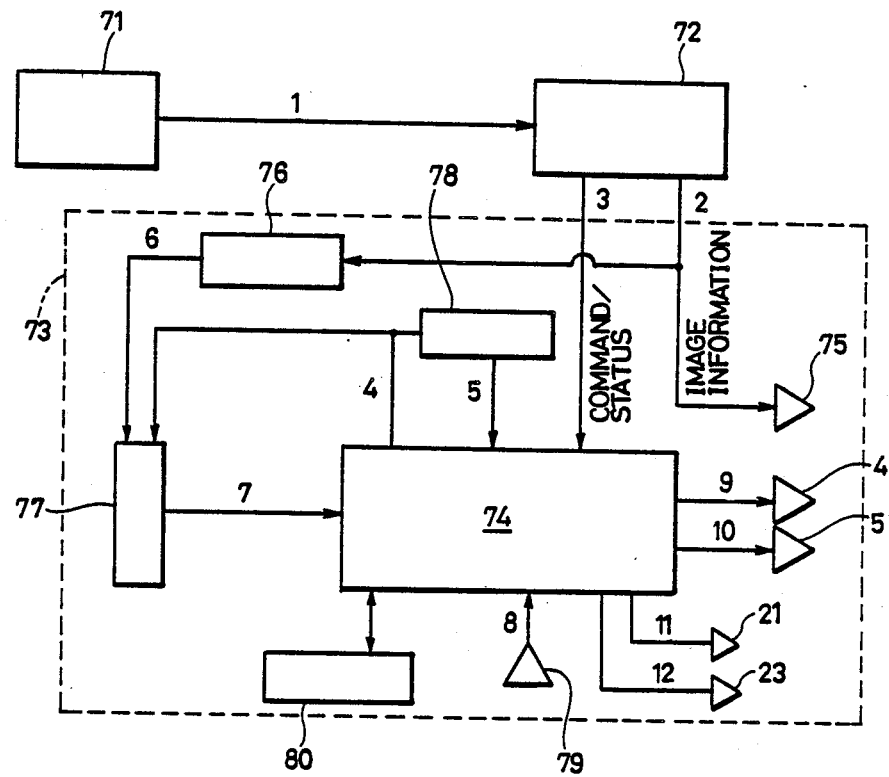
FIG. 8 is a block diagram showing contents of communication such as image data between the host machine and the printer portion in accordance with one embodiment of the present invention.

FIG. 8 is a block diagram showing the exchange of image data and information for controlling the developing units between each of the host machine 71, the controller 72 and the printer engine 73.

The printer data transmitted on the bus ① from the host machine 71 comprises image data, information for controlling the developing units and information for separation (paper select information). Upon reception of the printer data, the controller 72 forms a bit map based on the image data and transmit the same to a laser driving portion 75 of the printer engine 73 through a bus ②. The paper selecting information and the information for controlling the developing unit are transmitted to the printer engine 73 through a bus ③ command/status information. Upon reception of respective information through the bus ③, CPU 74 of the printer engine 73 controls switching of the first and second developing units through buses ⑨ and ⑩ switching of papers through buses ⑪ and ⑫.

A line counter 77 which counts the number of lines in accordance with information through a bus ⑥ connected to the CPU 74 through a bus ⑦.

Figure 18:
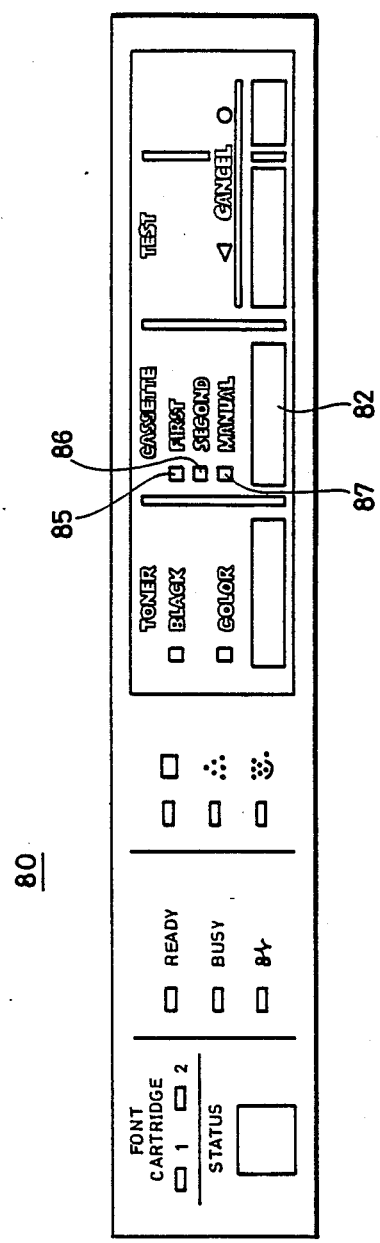
FIG. 18 is a plan view of an operation panel in accordance with one embodiment of the present invention.

A raster counter 78 is connected to the CPU 74 through buses ④ and ⑤, and, in addition, a raster sensor 79 is also connected thereto through a bus ⑧. Consequently, a distance, the number of lines or the raster number from the edge of the sheet can be used as the digital data for setting the timing of switching developing units. An operational panel 80 comprises LEDs 85, 86 and 87 indicating first, second and manual (manual feeding) state of cassette selection and a cassette selecting switch 82 for successively switching the selection of these states (see FIG. 18).

Figure 9:
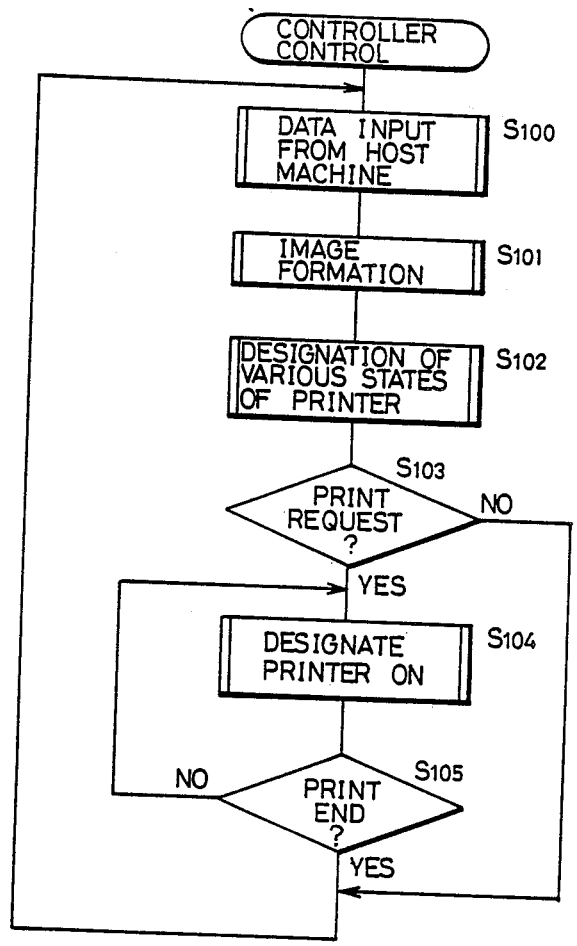
FIG. 9 is a flow chart showing a main routine of control of a controller shown in FIG. 8.

FIG. 9 is a flow chart showing a main routine of control of the controller 72. A data input routine is executed in the step S100, in which image data and data for controlling the printer are received from the host machine 71. In the step S101, an image forming routine is executed, in which the image data are spread to the image buffer. In the step S102, a routine for designating various states of the printer is executed, in which control data for the printer are respectively processed.

The control data comprises data for selecting developing units, designating the simultaneous bicolor printing, data such as switching timing of developing units for the simultaneous bicolor printing, selecting paper feed inlets and for setting mode of additional functions. The details of this routine will be described later. In the step S103, whether or not a print request is made from the host machine is determined, and if there is a request (YES in S103), a command for actually operating the printer is outputted (S104). In that case, the controller 72 is set in a mode for outputting image data. Once started, the print mode is normally maintained until the end of printing (YES in S105), and the flow returns to a normal loop at the end of printing.

Figure 10:
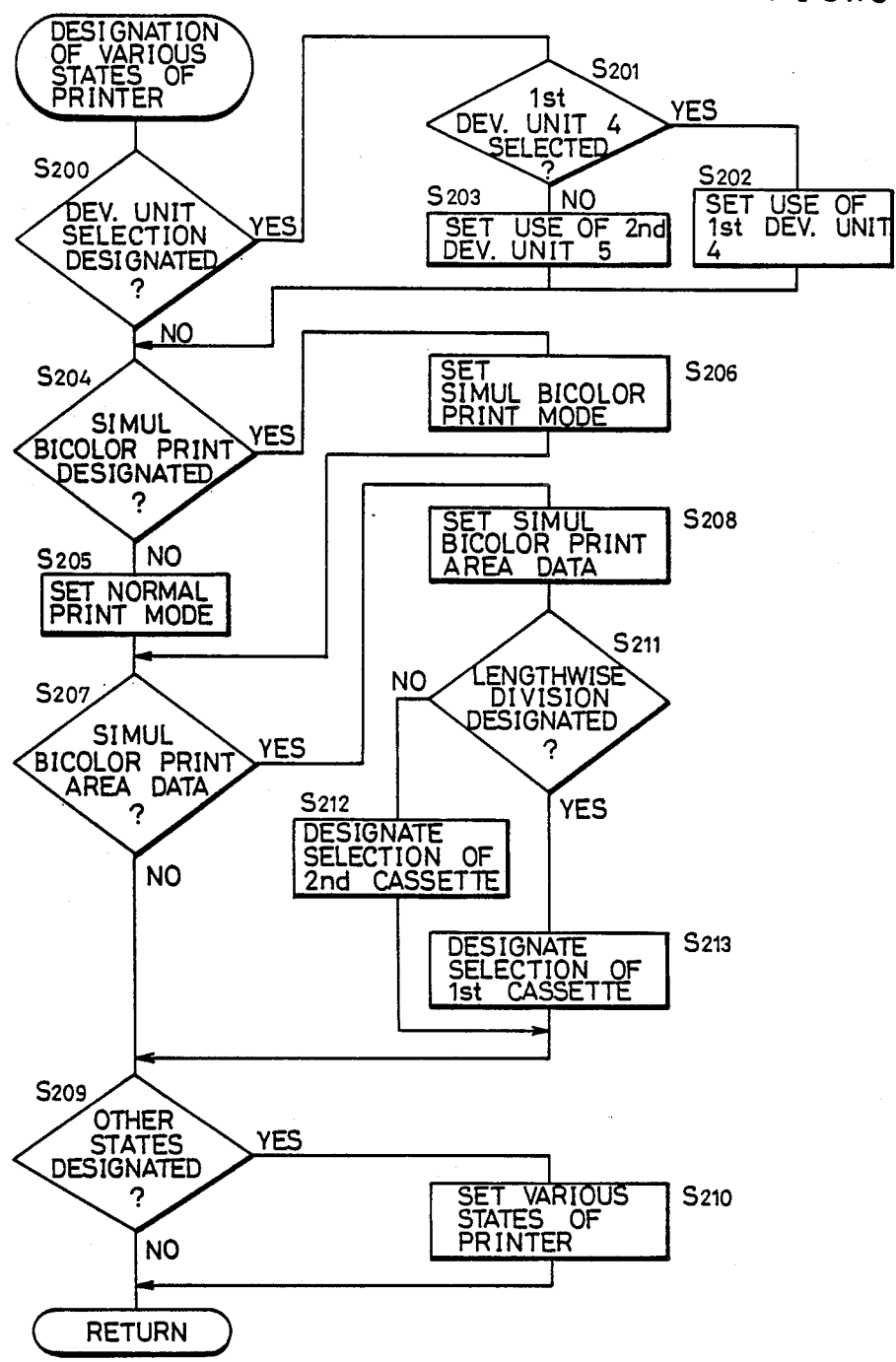
FIG. 10 is a flow chart showing specific contents of a various state designating routine of the printer shown in FIG. 9.

FIG. 10 is a flow chart showing the routine for designating various states of the printer shown in FIG. 9.

Many other states of the printer than the above mentioned selection of paper feed inlets, setting of mode of various additional functions are carried out. However, only the selection of developing units, designation of the simultaneous bicolor printing and the designation of the simultaneous bicolor printing area are described in order to facilitate understanding the simultaneous bicolor print mode, with reference to the present routine.

Figure 12C:
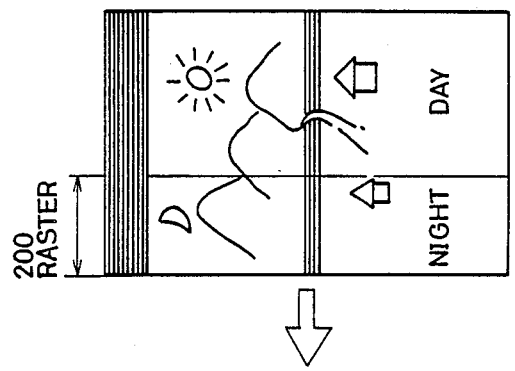
FIGS. 12A to 12C show an example of designation of lengthwise division in accordance with one embodiment of the present invention.
Figure 12B:
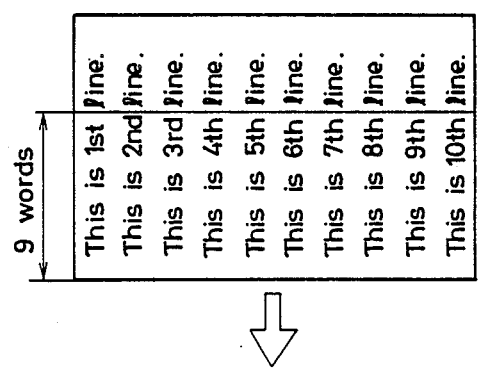
Figure 12A:
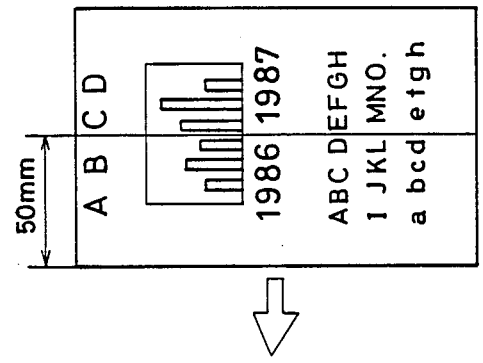

First, in the step S200, whether the selection of developing unit is designated or not is determined. If the selection of developing units is designated, then whether or not the first developing unit is selected is checked in the step S201. If it is selected, then the first developing unit is set to be used (S202). If not, the second developing unit is set to be used (S203). Thereafter, whether the simultaneous bicolor printing is designated or not is determined in the step S204. If it is not designated (NO in S204), then a normal printing mode is set (S205). In the normal printing mode, images on one page are all developed by a selected developing unit. If the simultaneous bicolor printing is designated (YES in S204), then the simultaneous bicolor print mode is designated (S206). Thereafter, whether the simultaneous bicolor print area data are designated or not is determined in the step S207. If the simultaneous bicolor print area data are designated, then, the simultaneous bicolor print area data are set (S208). If lengthwise division is designated for the bicolor printing (YES in S211), then selection of a first cassette is designated in S213. If it is NO in the step S211, that is, if the widthwise division is designated, then selection of a second cassette selection is designated (S212). Now, the designation of lengthwise division means a designation for drawing a line for division in the longitudinal direction of the sheet as shown in FIGS. 12A to 12C, and the first cassette contains sheet of papers such that the sheets are fed in the direction of the arrow.

Figure 11C:
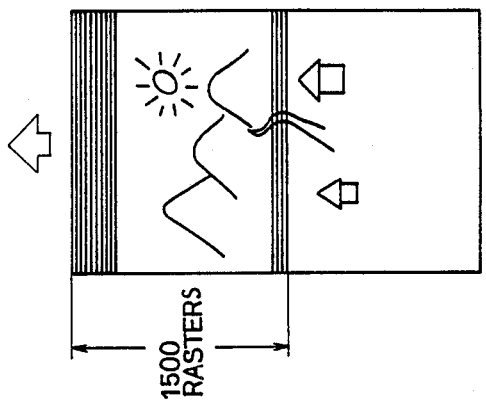
FIGS. 11A to 11C show an example of a designation of widthwise division in accordance with one embodiment of the present invention.
Figure 11B:
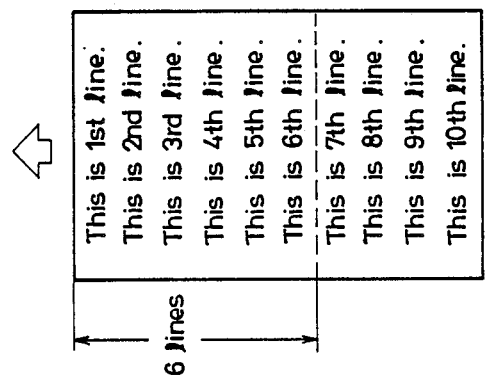
Figure 11A:
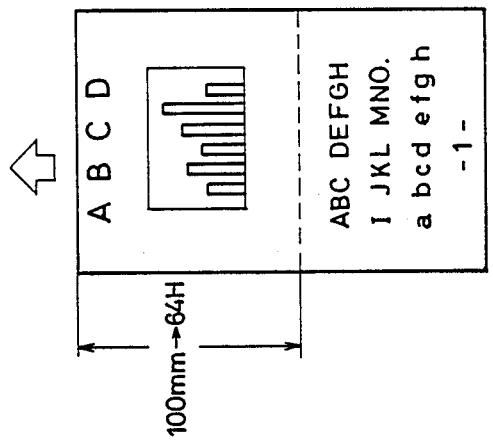

The designation of widthwise division is the designation for drawing a line for division in the widthwise direction of the original, as shown in FIGS. 11A to 11C, and the second cassette contains sheets of paper such that the sheets are fed in the direction of the arrow.

Thereafter, other designations for the states of the printer are checked, and when there are designations, various states of the printer are set (S210). The setting of various states of the printer may be carried out by setting data in an RAM area which is commonly accessible to the printer and the printer engine, or by updating data as needed by serial communication.

The setting of the simultaneous bicolor printing are data is carried out in the following manner. Namely, the distance from the edge of the sheet is represented by the unit of "mm", which is converted into hexadecimal data suitable for the interface of the printer engine as the state designating data to the printer. For example, when the developing unit must be changed at a position spaced by 100 mm from the edge of the paper as shown in FIG. 11A, the hexadecimal data of 64H is treated as the printer state designating data. The number of lines from the edge of the paper or the raster number may be used for setting the area, as shown in FIGS. 11B and 11C. FIG. 11A shows an example of designation of widthwise division, in which the lengthwise direction of the sheet is parallel to the direction of feeding the paper. The arrow in the drawing represents the direction of feeding the paper. FIGS. 12A to 12C show examples of setting the areas by the distance, the number of lines and the raster number from the edge of the sheet when lengthwise division is designated, in which the lengthwise direction of the sheet is orthogonal to the direction of feeding the paper.

Figure 13:
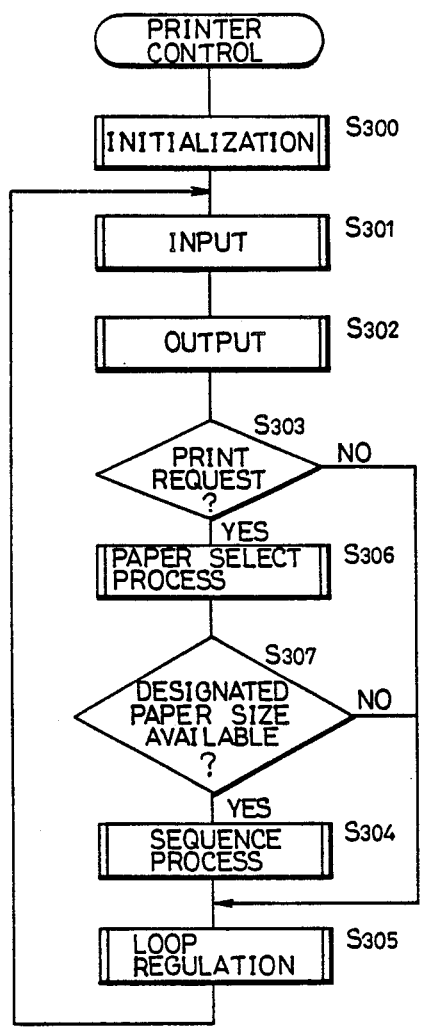
FIG. 13 is a flow chart of a main routine for controlling a printer engine in accordance with one embodiment of the present invention.

FIG. 13 shows a flow of a main routine for controlling the printer engine.

In the step S300, the printer engine is initialized. Then, the flow enters a main loop. The input processing routine and the output processing routine are carried out in S301 and S302, respectively. In the step S303, the presence/absence of a print command from the controller is checked. If there is the print command, the flow proceeds to the step S306 in which to designated size of the paper is checked. If there is no paper of the designated size (NO in S307), then the flow proceeds to the step S305, and the flow is kept in a waiting state until the paper of the designated size is set. If there is the designated size (YES in S307), then sequence processing is carried out in the step S304, a loop regulating (such as regulating a loop time) routine is carried out in the step S305, and the flow returns to the input processing routine (S301). If there is no print command in the step S303, then the loop regulating routine (S305) is executed, and then the flow returns to the input processing routine (S305).

Figure 14:
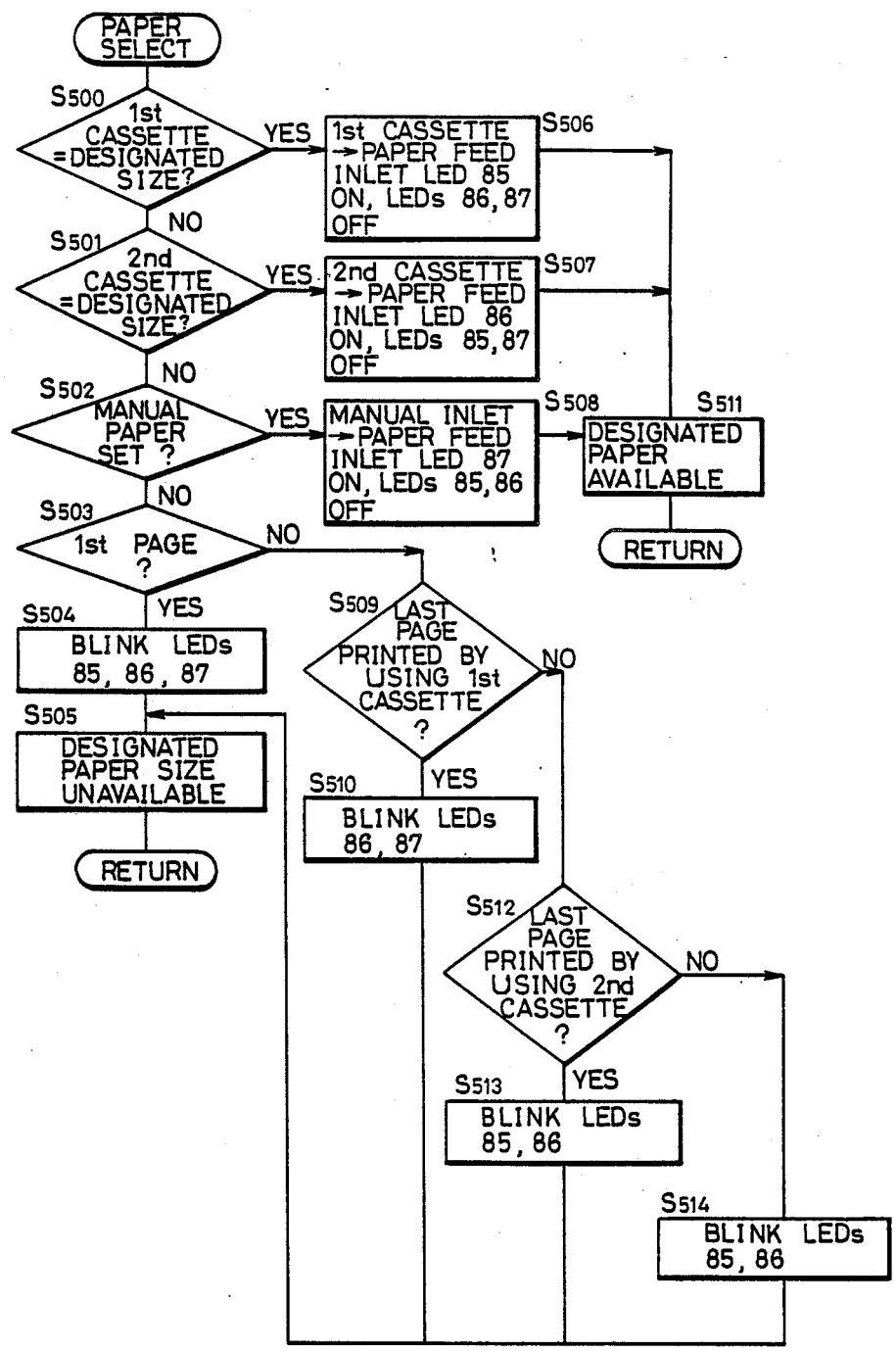
FIG. 14 is a flow chart showing a specific content of a paper select process routine shown in FIG. 13.

FIG. 14 shows specific contents of the paper select processing of FIG. 13. A paper feed cassette is selected in response to the designated size of paper, and data for turning on the corresponding cassette selection indicating LED are set. First, in the step S500, whether the paper of the designated size (including the size as well as the direction) is set in the first cassette 20 or not is checked. In the step S501, whether the paper of the designated size is set or not in the second cassette 21 is checked. Whether a paper is set in a manual inlet (manual feed inlet) or not is checked in the step S502. If it is NO in all the steps, then it is determined that the paper of the designated size is absent, and if the data to be printed is the first page (YES in S503), then all the cassette selection indicating LEDs 85, 86 and 87 are blinked (S504) so as to let the operator to set a cassette containing the sheets of paper of the designated size to the cassette inlet.

In the step S505, the printing operation is prevented, as there is no paper.

Meanwhile, if there is a sheet of paper of the designated size in the step S500, then the first cassette is selected as the paper feed inlet, the first cassette selection indicating LED 85 is designated to be turned on, and the second cassette selection indicating LED 86 and the manual selection indicating LED 87 are designated to be turned off, to provide an indication (S506). If it is YES in the S501, then the second cassette is selected to be the paper feed inlet, the LED 86 is designated to be turned on, and the LEDs 85 and 87 are designated to be turned off (S507). If it is YES in the step S502, then the manual inlet is selected to be the paper feed inlet, the LED 87 is designated to be turned on, and the LEDs 85 and 86 are designated to be turned off (S508).

Thereafter, in the step S511, the printing is permitted since there is the paper of the designated size, and the flow returns to the main flow.

If it is determined that the original is not the first page in the step S503 and if the last page is printed by using the first cassette (YES in S509), then blink data are set for the second cassette and manual indicating portions, so as to let the operator to change the cassette. In the steps S512 and 513, the second cassette is checked in the similar manner, and the similar indicating data are set. In the step S514, since it means that the last page is printed with the paper fed manually, the portion indicating the first and second cassettes are blinked.

The indication of cassettes on the operation panel is determined by the above described routine. Such indication and the actual output of turning on/off are carried out in the output routine shown in FIG. 13.

Figure 15:
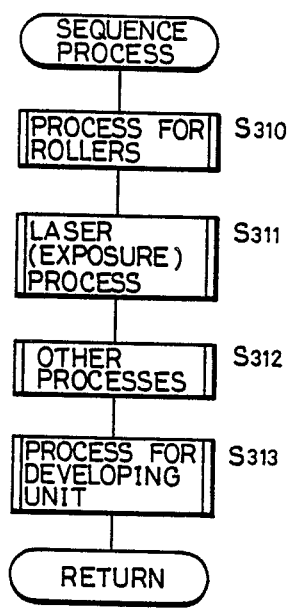
FIG. 15 is a flow chart showing a specific content of a sequence process routine shown in FIG. 13.

FIG. 15 shows the contents of the sequence processing routine of FIG. 13 (S304).

First, a roller processing routine is carried out in the step S310 in which the paper feeding and the discharging rollers are controlled to feed and discharge paper. In the step S311, a laser (exposure) processing routine is carried out in which the ON/OFF state of the laser is controlled. In the step S312, other process routines are carried out, for example, the processes for treating an accident and so on are carried out. Thereafter, in the step S313, the developing unit processing routine is carried out in which the switching of the developing units in the simultaneous bicolor printing mode is carried out.

The setting and control of the timing for switching the developing units in the simultaneous bicolor printing mode are carried out in the laser (exposure) processing routine (S311), and the actual switching is carried out in the developing unit processing routine (S313).

Figure 16:
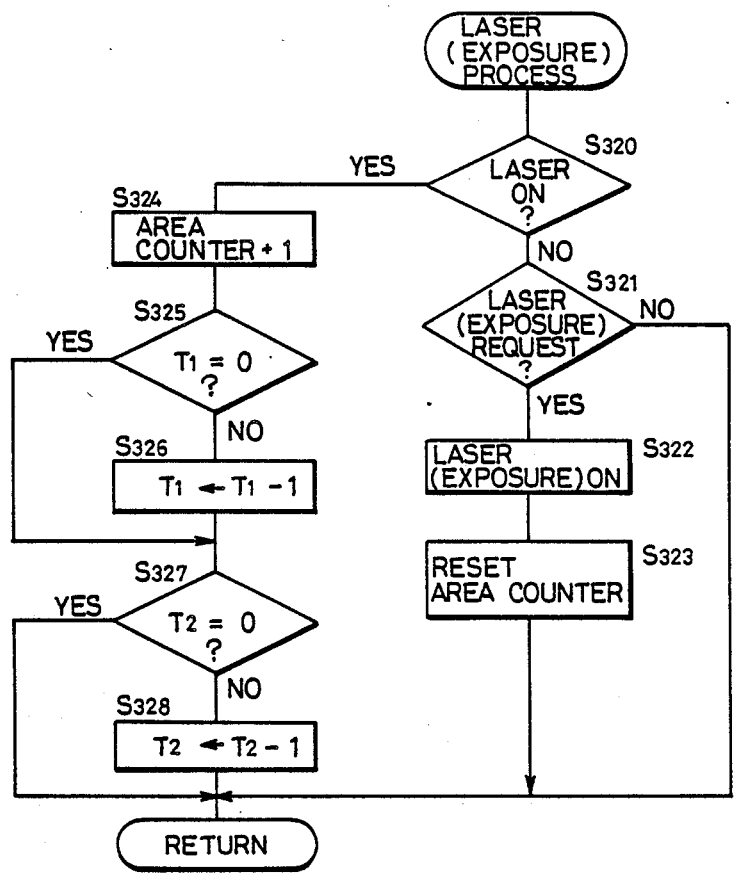
FIG. 16 is a flow chart showing a specific content of a laser process routine of FIG. 15.

FIG. 16 is a flow chart showing the contents of the laser (exposure) processing routine of FIG. 15.

The printer engine 73 which received the print command from the controller 72 enters the sequence processing as described above. First, in the step S320, the ON/OFF state f the laser is checked. Now, the laser is initially OFF in this case, the presence/absence of a request for turning the laser ON is checked (S321). If there is a request, then, the laser is turned ON (S322), and a print area counter is reset (S323) and the counter is set at the print start position. When the flow returns to the sequence processing loop after one circulation of the main loop, it is determined that the laser is ON (YES in S320), so that the counter of the print area is incremented. Thereafter, whether the timer set time periods T1 and T2 are set or not is checked in the steps S325 and S327. If the set time are set in respective steps, then the time periods T1 and T2 are respectively decremented in (S326) and (S328). The increment of the print area counter represents that the exposure was carried out for a time period in which the flow circulates the main loop for one time after the start of laser exposure. The decrement of the timer set time is to control the timing for switching the developing units. The functions of the time periods T1 and T2 will be described later.

Figure 17A:
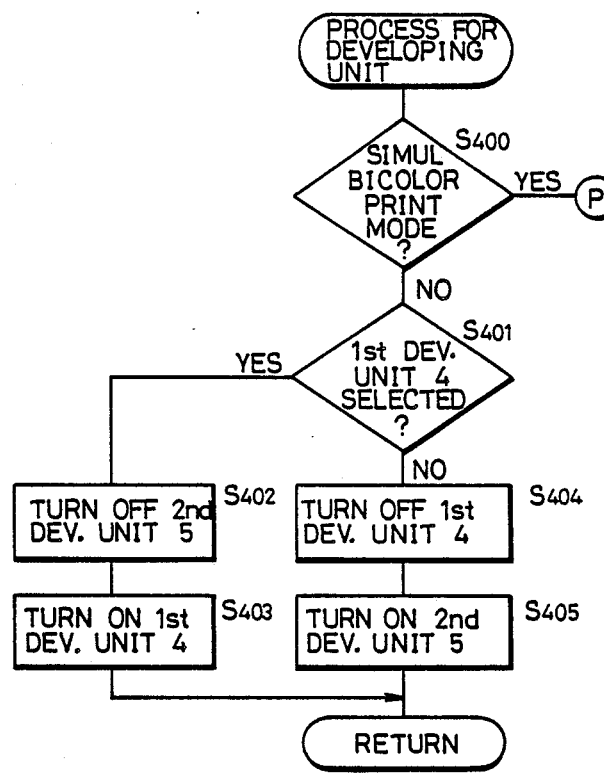
FIGS. 17A and 17B are flow charts showing specific contents of a developing unit process routine of FIG. 15.
Figure 17B:
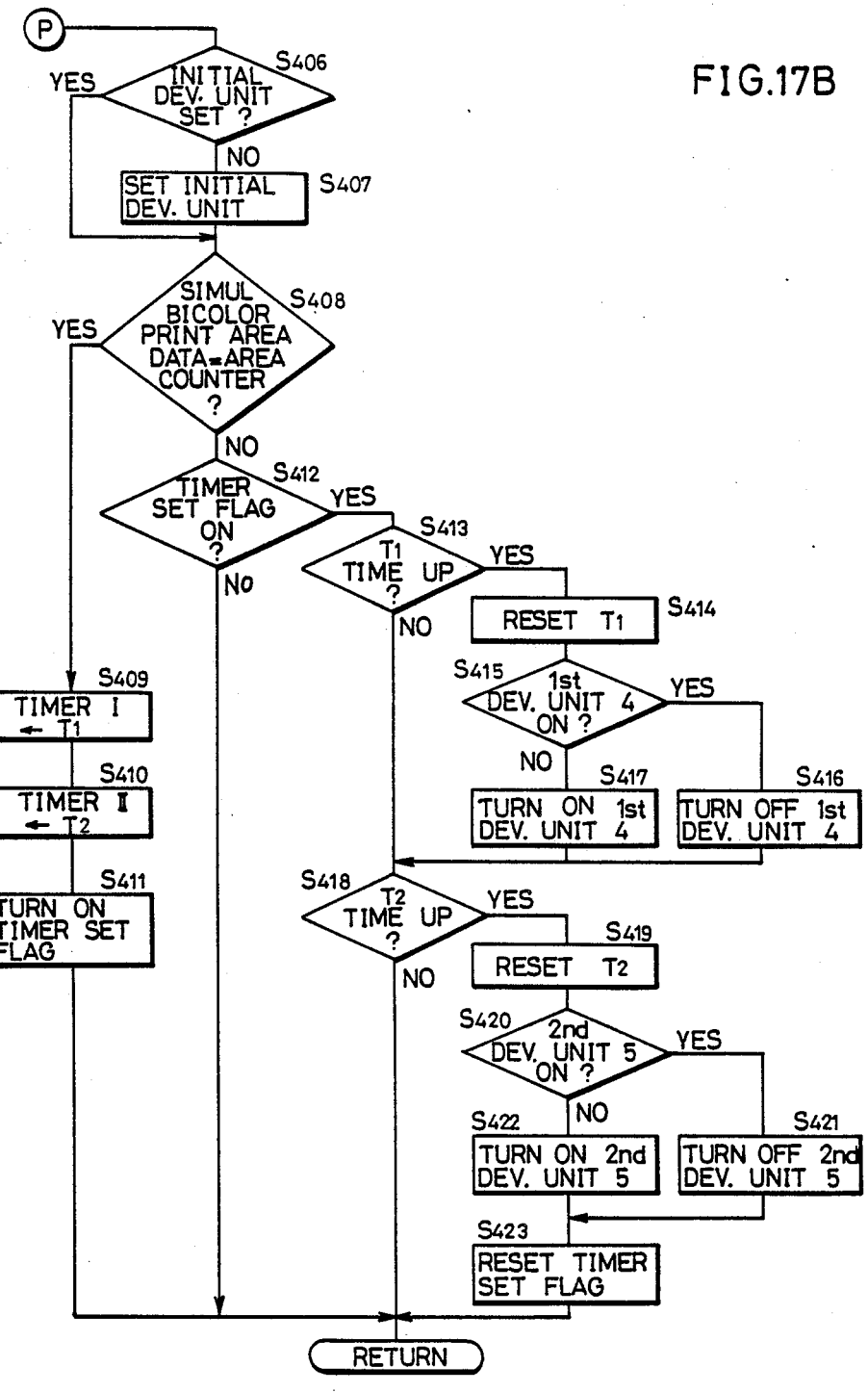

FIGS. 17A and 17B are flow charts showing the details of the developing unit processing routine (S313) of FIG. 15.

First, whether the operation is in the simultaneous bicolor printing mode or not is checked in the step S400. If it is in the normal print mode and not in the simultaneous bicolor printing mode, either one of the two developing units is selectively driven in accordance with the steps S401 to S405 and one entire page is printed in one color. Namely, when the first developing unit is selected in the step S401, then, the second developing unit is turned OFF (S402), and the first developing unit is turned ON (S403). If the second developing unit is selected, then, the first developing unit is turned OFF (S404) and the second developing unit is turned ON (S405).

If it is in the simultaneous bicolor printing mode (YES in S404), then the flow proceeds to the step S406 to determine whether the initial developing unit for the simultaneous bicolor printing mode is set or not. If the developing unit is not set, then, the initial developing unit is set in the step S407. Thereafter, in the step S408, whether or not the simultaneous bicolor printing area data supplied from the controller 72 coincides with the content of the area counter which is incremented in the laser (exposure) processing routine of the sequence processing routine is determined. If they coincide with each other, then the flow proceeds to the steps S409 and S410 in which a time period T1 is set in a timer I and a time period T2 is set in a timer II, and a timer set flag is turned ON (S411).

Now, the time periods T1 and T2 set in the timers will be described in the following. The contents of the print area counter represents the information of a position which is currently being exposed. A time period in which an exposure point which is currently being exposed reaches the developing point of the first developing unit 4 is represented by T1, and the time period in which the exposure point reaches the developing point of the second developing unit 5 is represented by T2.

More specifically, the time period required for the current exposure point W on the photoreceptor drum 1 to reach the point X in represented by T1 and the time required for the point W to reach the point X' is represented by T2. The time periods T1 and T2 can be calculated in accordance with the following equations $T1 = J/V$ sec.

$T2 = K/V$ sec.

in which a peripheral speed of the photoreceptor drum 1 is V mm/sec., a peripheral length from the exposure point W to the developing position X of the first developing unit 4 is J mm and the peripheral length from the point W to the developing position X' of the second developing unit 5 is K mm.

The timers I and II described with reference to the steps S409 and S410 are used for measuring a time lag between the time period corresponding to the exposure position W to the developing position X and to the position X', which are set to start the time measuring operation when the simultaneous bicolor printing area set data and the area which is currently exposed matched with each other. The set time periods T1 and T2 in the timers are successively decremented in the laser (exposure) processing routine, measuring the time period.

If the simultaneous bicolor printing area data does not match the content of the area counter (NO in S408), then the flow proceeds to the step S412 in which whether the timer set flag is turned ON or not is checked. If it is not ON, then the present routine is terminated. If the timer set flag is ON (YES in S412), then the end of the set time periods T1 and T2 in the timers are checked in the steps S413 and S418. If the end of the time period T1 set in the timer is recognized in the step S413, then the time period T1 is reset (S414). Thereafter, if the first developing unit 4 is ON and operating (YES in S415), then the first developing unit 4 is turned OFF (S416). If the first developing unit is OFF, then it is turned ON to operate the first developing unit 4. If the end of the set time period T2 is recognized in the step S418, then the time period T2 is reset (S419). If the second developing unit 5 is ON and operating (YES in S420), then the second developing unit 5 is turned OFF (S421). If the second developing unit 5 is OFF, the second developing unit 5 is turned on to operate the second developing unit 5 (S422) and, simultaneously, the timer set flag is reset (S423). In this manner, the switch driving of the developing units is carried out independent from the initial setting of the developing units.

Although simultaneous bicolor printing is realized by selectively switching and driving two developing units in the present embodiment, simultaneous multicolor printing can be realized by selectively switching and driving three or more developing units.

The controller 72 forms a bit map based on the image data and the control data transmitted from the host machine 71, as described in the foregoing. In that case, approximate processing such as rotating the images on the bit map is carried out corresponding to the direction of transporting the sheet of paper or based on the set data of lengthwise or widthwise division, out of the control data.

Processes based on a collating function may be carried out on the copy papers automatically discharged, in accordance with the present invention.

As is apparent from the above described specific structure and the embodiment, setting of the timing for switching a plurality of developing units containing developers of different colors for selectively switching and driving the same is carried out in accordance with a signal applied from the host machine. Therefore, switching of the developing units in a printer can be carried out while printing 1 page, so that simultaneous multicolor printing can be easily realized. In addition, paper feed cassettes having different directions of transporting sheets of paper corresponding to the lengthwise division and the widthwise division can be automatically switched and selected, facilitating the multicolor printing.

If the sheets of paper contained in the selected paper feed cassettes are exhausted, a process may be carried out to temporarily stop the printing operation.

If the selected paper feed cassette is not set, there will be a warning indication, which is very convenient for use.

A lengthwise divided and widthwise divided color printing can be provided by an apparatus having a single cassette only, provided that the direction of transporting sheets of paper can be changed.

In addition, in an apparatus having two cassettes, the color printing can be easily provided by resetting the cassettes or by manually feeding paper, when only a particular page is to be printed with different direction of separation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording system comprising a host control unit for generating image data and a printer apparatus for forming an image on a sheet of paper in accordance with the image data generated from said host control unit, said printer apparatus having a function of dividing the image into at least two image areas with respect to a boundary extending in a direction orthogonal to the direction of transport of the paper and of forming each of the image areas with different colors, said host control unit adapted to supply to said printer apparatus a boundary signal indicative of the boundary of said at least two image areas to be printed with different colors, said printer apparatus comprising selecting means for automatically selecting a first orientation in which the lengthwise direction of the sheet is the direction of transport when said boundary signal indicates a boundary extending in the widthwise direction of the sheet, and for automatically selecting a second orientation in which the widthwise direction of the sheet of paper, when said boundary signal indicates a boundary extending in the lengthwise direction of the sheet.

2. An image recording system according to claim 1, wherein said printer apparatus further comprises warning means for giving a warning when the desired orientation corresponding to said boundary signal is unavailable.

3. An image recording system according to claim 1, wherein said printer apparatus further comprises prohibiting means for prohibiting printing operation when the desired orientation corresponding to said boundary signal is unavailable.

4. An image recording system according to claim 1, wherein said printer apparatus further comprises first paper feeding means responsive to the selection of said first orientation by said selecting means for feeding a sheet of paper with the lengthwise direction of the sheet being parallel to the direction of transport, and second paper feeding means responsive to the selection of said second orientation by said selecting means for feeding a sheet of paper with the widthwise direction of the sheet being parallel to the direction of transport.

5. An image recording system according to claim 4, wherein said printer apparatus further comprises third paper feeding means for manually feeding paper in a direction corresponding to either of the orientation selected by said selecting means.

6. An image recording system comprising a host control unit for generating image data and a printer apparatus for forming an image on a sheet of paper in accordance with the image data generated from said host control unit, said host control unit adapted to supply to said printer apparatus a boundary signal indicative of a boundary of two image areas which are to be printed in different colors, said printer apparatus comprising:

a photoreceptor on which a latent electrostatic image is formed;

image forming means for forming the latent electrostatic image of one page on said photoreceptor;

a plurality of developing means for developing the latent electrostatic image formed on said photoreceptor with toners of different colors for transforming the same to a toner image;

transferring means for transferring the toner image on said photoreceptor onto a sheet of paper;

control means responsive to said boundary signal from said host control unit for controlling said plurality of developing means such that the development of the latent electrostatic image of 1 page by one developing means is switched to the development by another developing means;

selecting means for selecting a first orientation in which the lengthwise direction of the sheet is the direction of transport, when said boundary signal indicates a boundary extending in the widthwise direction of the sheet, and for selecting a second orientation in which the widthwise direction of the sheet is the direction of transport, when said boundary signal indicates a boundary extending in the lengthwise direction of the sheet;

whereby the latent electrostatic image formed on said photoreceptor is divided into two image areas with respect to the boundary corresponding to said boundary signal, each of said image areas developed with toner of different colors.

7. An image recording system according to claim 6, wherein said printer apparatus further comprises warning means for giving a warning when the desired orientation corresponding to said boundary signal is unavailable.

8. An image recording system according to claim 6, wherein said printer apparatus further comprises prohibiting means for prohibiting printing operation when the desired orientation corresponding to said boundary signal is unavailable.

9. An image recording system according to claim 6, wherein said printer apparatus further comprises first paper feeding means responsive to the selection of said first orientation by said selecting means for feeding a sheet of paper with the lengthwise direction of the sheet being parallel to the direction of transport, and second paper feeding means responsive to the selection of said second orientation by said selecting means for feeding a sheet of paper with the widthwise direction of the sheet being parallel to the direction of transport.

10. An image recording system according to claim 9, wherein said printer apparatus further comprises third paper feeding means for manually feeding paper in a direction corresponding to either of the orientation selected by said selecting means.

11. An recording system according to claim 6, wherein each of said developing means comprises a developing unit arranged around said photoreceptor.

* * * * *